(12) United States Patent
Ruetenik

(10) Patent No.: US 9,770,018 B2
(45) Date of Patent: Sep. 26, 2017

(54) ROCKER SHOE AND ATTACHMENT FOR AN EQUINE BOOT ASSEMBLY

(71) Applicant: Monty L. Ruetenik, Clear Lake Shores, TX (US)

(72) Inventor: Monty L. Ruetenik, Clear Lake Shores, TX (US)

( * ) Notice: Subject to any disclaimer, the term of this patent is extended or adjusted under 35 U.S.C. 154(b) by 55 days.

(21) Appl. No.: 15/138,002

(22) Filed: Apr. 25, 2016

(65) Prior Publication Data

US 2016/0249597 A1  Sep. 1, 2016

Related U.S. Application Data

(63) Continuation-in-part of application No. 14/303,346, filed on Jun. 12, 2014, and a continuation of application No. 12/882,352, filed on Sep. 15, 2010, now abandoned, and a continuation-in-part of application No. 14/046,751, filed on Oct. 4, 2013, now abandoned, and a continuation-in-part of application No. 15/051,343, filed on Feb. 23, 2016.

(60) Provisional application No. 61/881,556, filed on Sep. 24, 2013, provisional application No. 62/264,935, filed on Dec. 9, 2015, provisional application No. 61/244,371, filed on Sep. 21, 2009.

(51) Int. Cl.
*A01L 7/02* (2006.01)
*A01L 15/00* (2006.01)
*A01K 13/00* (2006.01)

(52) U.S. Cl.
CPC .............. *A01L 7/02* (2013.01); *A01K 13/007* (2013.01); *A01L 15/00* (2013.01)

(58) Field of Classification Search
CPC ...... A01L 5/00; A01L 7/02; A01L 1/04; A01L 15/00; A01K 13/007
USPC ........... 168/4, 10, 12, 13, 14, 20, 24, 26, 28
See application file for complete search history.

(56) References Cited

U.S. PATENT DOCUMENTS

| | | | | |
|---|---|---|---|---|
| 1,492,525 A * | 4/1924 | Miller | ......... | A01L 7/06 168/14 |
| 2,191,834 A * | 2/1940 | Slack | ......... | A01L 7/02 168/28 |
| 5,172,766 A * | 12/1992 | Adkins | ......... | A01L 5/00 168/14 |
| 5,439,062 A * | 8/1995 | Ovnicek | ......... | A01L 7/02 168/14 |
| 6,672,395 B1 * | 1/2004 | Ovnicek | ......... | A01L 7/02 168/14 |
| 6,868,656 B2 * | 3/2005 | Osha | ......... | A01K 13/007 168/2 |
| 2005/0072128 A1 * | 4/2005 | Ruetenik | ......... | A01K 13/007 54/82 |
| 2006/0021758 A1 * | 2/2006 | Ovnicek | ......... | A01L 7/02 168/4 |

* cited by examiner

*Primary Examiner* — Son T Nguyen
(74) *Attorney, Agent, or Firm* — Douglas Baldwin

(57) ABSTRACT

An equine boot attachment and/or solid structure shoe that is designed to be attached on the underside of an equine boot or an equine hoof that allows the boot or hoof to roll forward, or to the side, without unnecessary bending, thus allowing an equine user to find a comfortable natural position to relieve stress on a sore, injured or diseased hoof. The rocking action allows the equine to adjust its stance to find the most comfortable position, not unlike standing in a bed of sand. This ability to find a naturally comfortable standing position is especially important for equine with lameness such as laminitis.

9 Claims, 7 Drawing Sheets

ROCKER SHOE AND ATTACHMENT FOR AN EQUINE BOOT ASSEMBLY

CROSS REFERENCE TO RELATED APPLICATIONS

This application is a continuation in part application of U.S. application Ser. No. 14/303,246, filed Jun. 12, 2014, which is a continuation application of U.S. application Ser. No. 12/882,352, filed Sep. 15, 2010 that claims priority to provisional application 61/244,371, filed Sep. 21, 2009 and is also a continuation in part application of U.S. application Ser. No. 14/046,751, filed Oct. 4, 2013 that claims priority to provisional application 61/881,556, filed Sep. 24, 2013 and is also a continuation in part application of U.S. application Ser. No. 15/051,343, filed Feb. 23, 2016 which claims priority to provisional application 62/264,935, file Dec. 9, 2015. The contents and disclosures of each of these applications are incorporated herein by reference in their entirety for all purposes.

BACKGROUND

Field of the Invention

This invention relates to an attachment for an equine boot and a solid dual density horseshoe that allows the boot or hoof to rotate forward having a break-over point near the centerline, front to back, of the sole of the boot. Specifically, it relates to an attachment for the underside of an equine boot or hoof that allows the boot or hoof to more easily break-over to enable an equine to find a more naturally comfortable position.

Background

It has been reported that the estimated economic loss due to lameness in horses is between $678 million and $1 billion annually (USDA-APHIS, 2001). Although there are many reasons, sole bruising and disease such as laminitis are a common causes of lameness in horses. A thin sole provides insufficient protection to the foot and predisposes a horse to sole bruising (Stashak, 1987; Dabareiner et al., 2003). Lack of adequate sole thickness may be predisposed by genetics or caused by laminitis or injury. See Article Professional Animal Scientist, December 2006 by Haffner, J, Wooten, M, Dunson, D, Bowers, D, Hoffman, R.

As explained in the website www.therapeutichorseshoeing.com "Laminitis or "founder" is an equine hoof disease where the coffin bone (third phalanx, P3) begins to lose its attachment to the inner hoof wall and begins to rotate toward the front of the hoof or sink within the hoof capsule. Laminitis is generally thought to result from an imbalance in the horse's internal system. For example, an injury or upset to some part of the body is combated by the circulatory system as blood rushes to the injured area. The momentary reduction in blood flow deprives the capillaries which feed the lamina. The lamina is the "velcro" that attaches the bone to the hoof wall. In the brief time the lamina lacks sufficient blood flow, the capillaries begin to die and the "Velcro" attachment is weakened. The deep flexor tendon is attached to the bottom (palmar surface) of the coffin bone. This tendon is an extension of a muscle which reacts to the pain of the tearing lamina. As the muscle contracts, the tendon is in tension and pulls on the coffin bone. Once this pain cycle is established, it must be broken before healing can begin."

While lameness, especially that caused by laminitis is difficult to cure, it is possible to relieve some of the pressure and pain by use of proper trimming, shoes or boots that allow the horse to find a comfortable position and to relieve unnecessary pressure on a lame hoof. Such relief is often essential to an eventual cure.

One commercial shoe that has found acceptance is sometime called a "banana" or "rocker" shoe or clog. This is a shoe that is shaped to allow break-over adjustment by a "rocker" effect of the sole of the hoof so that the horse can more easily find a comfortable position—by adjusting the palmar/planar angle to take pressure and stress off affected areas of the hoof. The "Clog" is a shoe developed by Dr. Micheal L. Steward, DVM of Oklahoma is one of the first to use the concept of a self-adjusting in a wooden shoe that is screwed and/or glued directly to the hoof. Adaptations of the Stewart Clog have been made of other materials. These shoes, while somewhat effective are attached directly to the hoof and are not, therefore, easily changed without damage to the hoof. The present invention is a boot attachment and shoe that overcomes deficiencies of other shoes or boots.

SUMMARY OF THE INVENTION

This invention is an equine boot attachment and/or solid structure shoe that allows the boot or hoof to roll forward, or to the side, without unnecessary bending, thus allowing an equine user to find a comfortable natural position to relieve stress on a sore, injured or diseased hoof. The rocking action allows the equine to adjust its stance to find the most comfortable position, not unlike standing in a bed of sand. This ability to find a naturally comfortable standing position is especially important for equine with lameness such as laminitis.

In one aspect the invention is a "rocker" attachment for placement on the underside of an equine boot that allows the boot to rotate forward and back having a break-over point within about two inches of the centerline of the boot, measured front to back. In another embodiment it is an entirely solid (a structure without opening that generally substantially covers an equine hoof underside) substantially hoof shaped dual density (hard section on top section and softer section below) shoe that attaches directly to an equine hoof.

In another aspect the invention is an equine boot assembly having an equine boot comprising; an upper section made from flexible material shaped to fit around the hoof of a horse comprising a front, sides, and rear, a fastening means to fasten the front and rear together around the leg of a horse, a bottom section, a solid sole plate and optionally an elastomeric pad disposed inside the boot and: a "rocker" and optionally a spacer attachment for the underside of the bottom section that allows the boot to rotate forward having a break-over point within about two (2) inches of the sole centerline, front to back, of the bottom section of the boot. The rocker attachment for the boot and/or the shoe may comprise at least two components, one harder component to attach immediately beneath the sole of the boot or hoof (and preferably patterned on the underside). The boot rocker attachment may be adapted to have its position adjusted on the spacer.

It is also, in one embodiment, a kit for providing an attachment to the underside of an equine boot comprising an attachment, in one or two pieces, shaped to allow the boot to rotate forward and back having a break-over point within about two (2) inches of the centerline of the sole of the boot (front to back), specially adapted to fit the boot sole to which it is to be attached and a means of attaching the attachment to the boot sole.

One benefit of the present invention is that it can replace expensive hoof treatment by a Ferrier and can easily be utilized directly by an equine owner.

DETAILED DESCRIPTION OF THE INVENTION

Figure 1:
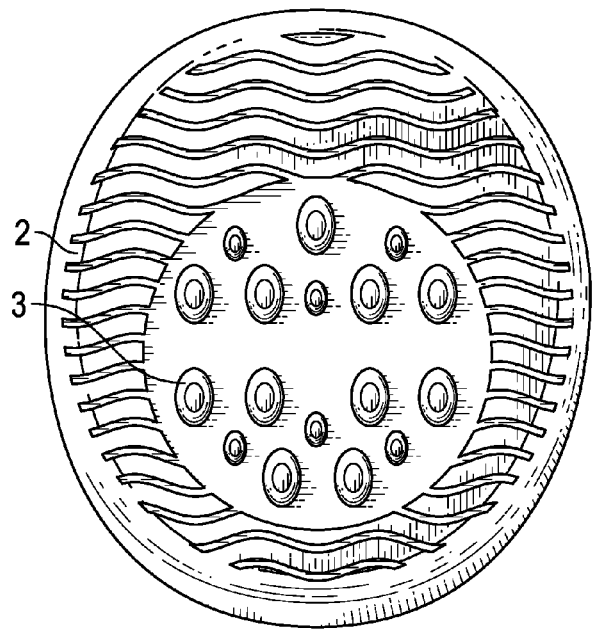
FIG. 1 is a bottom view of a boot sole that is a component of an embodiment of the present invention.

The solid "rocker" attachment and rocker shoe of the present invention comprises structure that is adapted for attachment to the underside or sole of an equine boot or an equine hoof, that allows the boot or hoof to rock forward—break-over—when tilted, as by movement of the equine leg, thus allowing the equine to find a naturally comfortable position. Horses that are lame, by laminitis or otherwise, will naturally seek a comfortable standing position. When standing, walking or running the horse will greatly benefit from the ability of the boot or shoe, and thereby the hoof, to roll forward or backward without unnecessary bending that puts pressure on the toe of the hoof. The "rocker" attachment and boot and shoe of the present invention accomplices that. By moving the break-over (lever-arm of the hoof) back from the front of the hoof, pressure is unloaded from the hoof wall so that the hoof lamina does not have to do all the work of holding the bony column of the hoof and leg to the furthest point out toward the front of the hoof. Without a rocker shoe or boot the pressure in on the front hoof wall when the hoof is tilted forward. Break-over, as the term is used herein, is the last point of the hoof or shoe to come off the ground when the horse is moving. The further forward the break-over is, the more levering affect there is placed on the foot and potential strain on the entire back portion of the limbs A significant advantage of the rocker attachment and shoe of the present invention is that it does not require special training or specialized farriers. Other currently available clog shoes and other metal rocker shoes have to be specially fitted and attached directly to the hoof. If improperly fitted such attachment can cause more harm than good. Badly fitted shoes can permanently cripple a horse. The present invention is easily used by any horse owner and can be used even in remote areas that do not have the advantage of a local equine podiatrist available. The present invention thus provides a more economical and more readily available solutions to equine lameness.

Chronic laminitis most commonly involves the distal displacement (rearward movement/rotation and sometimes sinking) due primarily to trauma, insult or swelling of the lamina (attachment tissue) of the P3 (coffin bone or distal phalanx) to the hoof wall. The deep digital flexor tendon, (doing its job), continues to keep tension on the boney column and further pulls the P3 out of the ideal position within the hoof capsule, resulting in an alignment shift of the weight-bearing functionality of the P3 from its solar surface (bottom of bone should be parallel to the ground surface). This realignment, results in chronic pain and over time decreased sole growth (contracted heels etc.). Many realignment techniques of the P3 cannot be achieved during the initial developmental stages of laminitis because the hoof capsule is unstable and continually changing. Many traditional mechanical realignment procedures like therapeutic trimming or special shoes have been very problematic, painful and traumatic to the horse; are expensive and do not achieve the successful outcomes the horse owners desire. The tension on the deep digital flexor tendon can be lessened as the horse feels is necessary yet the rocker capability of the attachment of this invention does not force the hoof into an uncomfortable, unnatural position continually. Constant severely elevated heels can have the effect overtime of continually shortening the tendon there by requiring additional procedure to comfort the animal.

The boot attachments of this invention provide an efficient, horse self-adjusting approach to sole supportive realignment of the P3 as the hoof grows out.

For the rocker attachment of the present invention adapted for use on an equine boot, the sloped front of the boot sole to which the a rocker attachment may be attached described in U.S. Pat. No. 7,445,051, issued Nov. 4, 2008, D565256, issued Mar. 25, 2008 and U.S. patent application Ser. No. 11/652,187 filed Jan. 11, 2007 and U.S. patent application Ser. No. 12/284,925 filed Sep. 24, 2008 provides a more gentle and beneficial break-over than conventional shoes or boots but often more assistance is needed. The present invention adds greatly to that benefit by with an attachment that allows moving the break-over point further towards the rear than is possible with the sloped boot sole alone. It also allows ready customization and adjustment of the break-over point.

Figure 5:
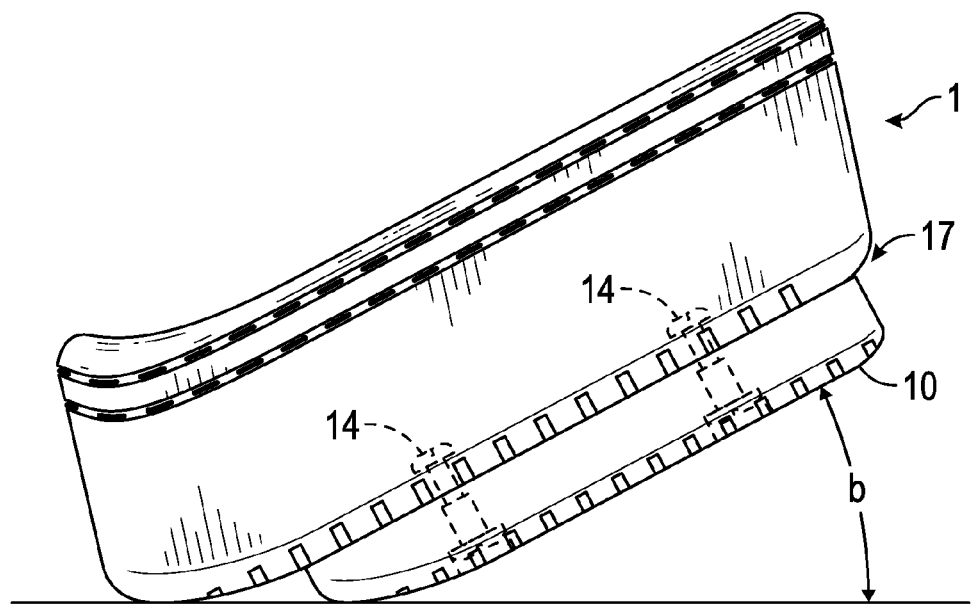
FIG. 5 are a side view of a boot sole with an attachment of the invention showing the boot/attachment tilted forward.
Figure 6:
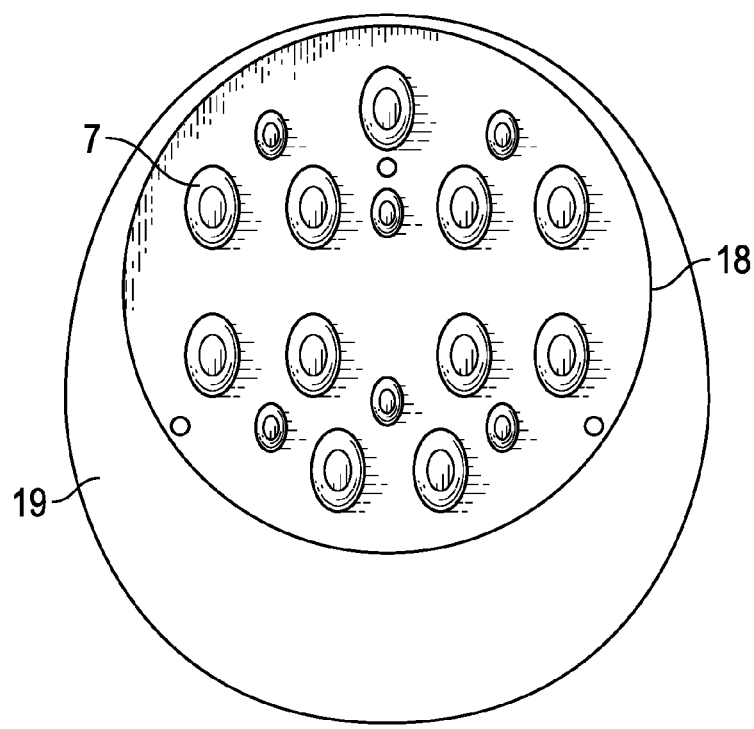
FIG. 6 is a bottom view of the underside of an attachment.
Figure 7:
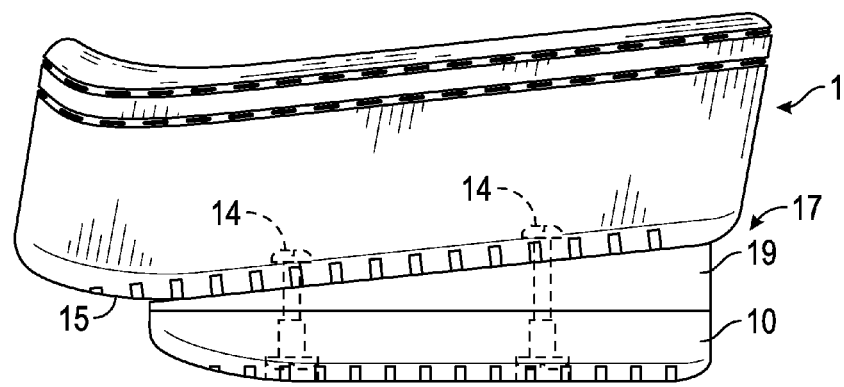
FIG. 7 is a side view of a boot sole attachment and a wedged spacer that allows the boot/attachment to tip forward at a greater angle.

Referring to the Figures, FIG. 2 is a side view of a molded equine boot sole plate, 1, with a rocker attachment 10. The illustrated sole plate is usually and preferably comprised of a molded relatively hard (Shore A 80-90) elastomeric base circumscribed by a wall into which a fabric boot is fitted. The sole plate shown has a sloped front, 15, to allow it to more easily tip forward. FIG. 1 is the bottom view of the sole plate, 2, of an embodiment of the invention, showing dot-like projections, 3, or pattern that will mate with depressions in the attachment 10. This mating pattern may also be used to advantage on spacers rather than the rocker attachment as discussed below. The attachment as shown in FIGS. 2, 5 and 7 can, in some embodiments, extend beyond the boot sole in the rear. This extension puts more of the surface of the attachment under the heel of the hoof giving it increased stability. This extension can be from 0 to about 2 inches and, in a preferred embodiment, is about ½ inch.

Figure 2A:
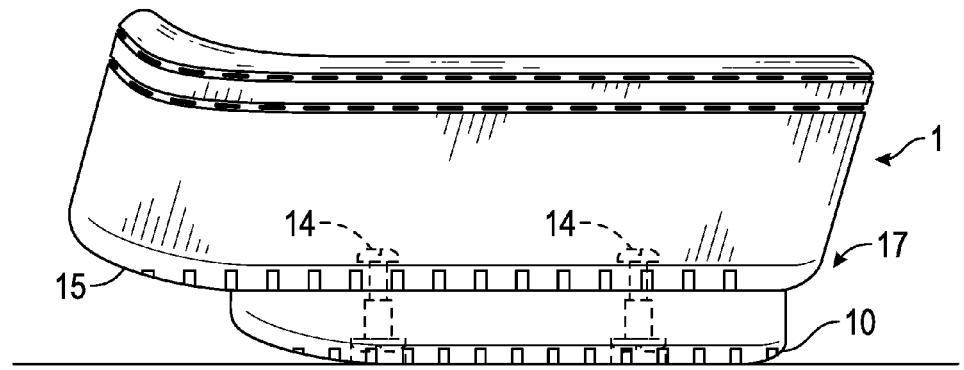
FIG. 2A is a side view of a boot sole with an attachment of the invention.

FIG. 2A is a side view of a shoe structure, 40, showing the hard layer section 48, the soft section 42, with the front slope at 46 and rear rounding at 10.

FIGS. 2A, 4, 5 and 7 show the attachment sloped in front but with relatively little slope in the rear. In some embodiments (FIGS. 12A and 12B) the rear may be sloped in much the same manner and angle as front making a somewhat symmetrical (front to back) "rocker The attachment and shoe of embodiments of the invention is a solid structure shaped substantially in the form of an equine hoof underside (see FIGS. 1, 3, 6 and 11) that does not have an opening in the center as in conventional horseshoes and some open bottom boots. The term solid structure, and solid rocker attachment therefore, as used herein means a structure as illustrated in the Figures that is a unitary solid structure without a center opening.

In the illustrative embodiments shown in the Figures, as example of appropriate dimensions, the length—front to back—of the attachment as well as the shoe is about 5.5 inches, the width about 5.25 inches, the projection 16 is about 0.2 inches above the surface of the attachment 10, the point c is about 1.5 inches from the front of the attachment and the thickness of the attachment, at the center, is about 0.75 inches. These dimensions will vary to accommodate boots for the various sizes and shapes of equine hoofs.

Figure 2B:
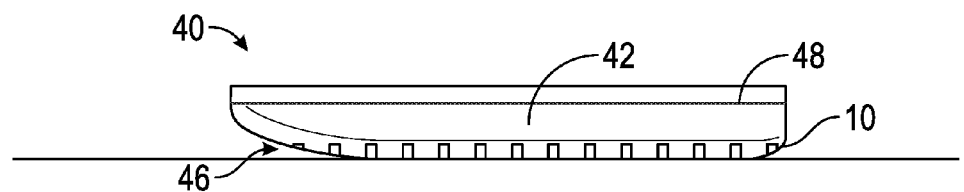
FIG. 2B is a side view of a boot sole with an equine shoe of the invention.
Figure 3:
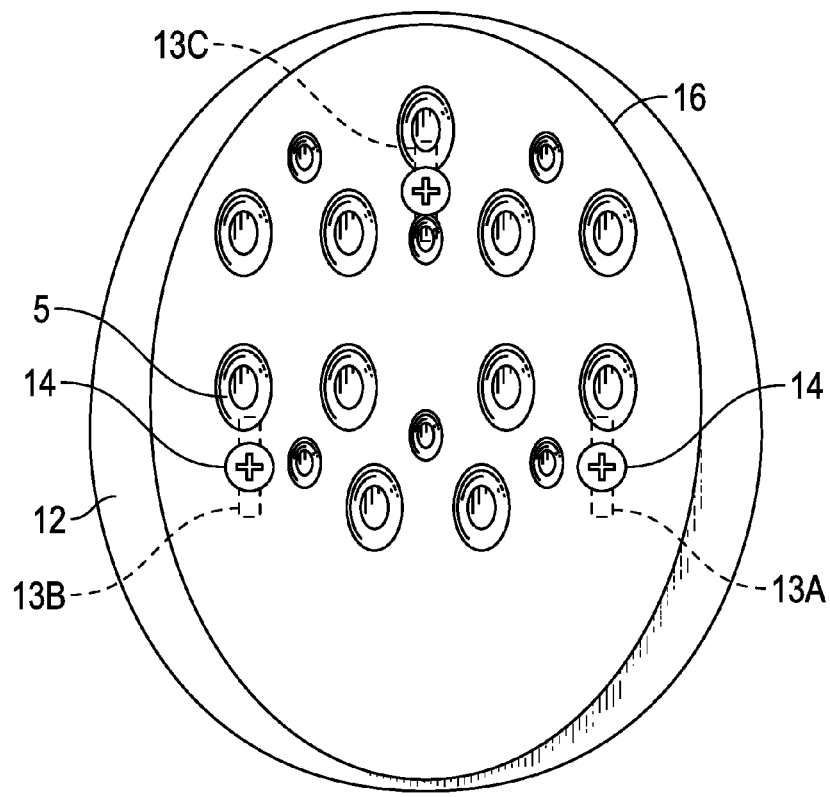
FIG. 3 is a bottom view of an attachment of the invention showing a raised portion and dot-like indentures to mate with raised dot-like projections of a matching boot sole.
Figure 9:
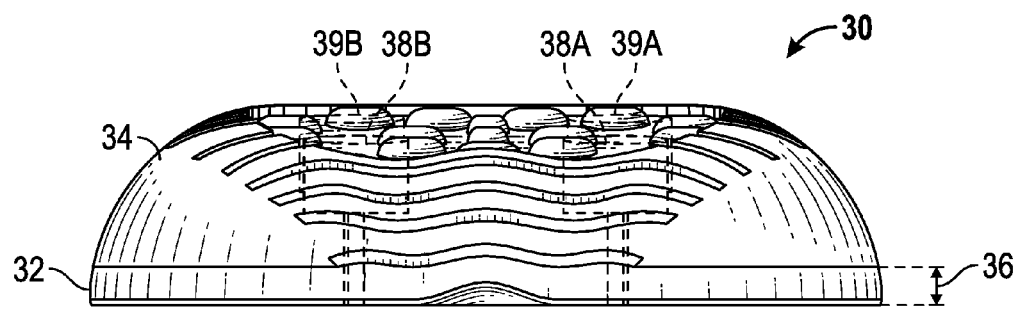
FIG. 9 is an end view of a boot attachment or shoe of embodiments of the invention.
Figure 10:
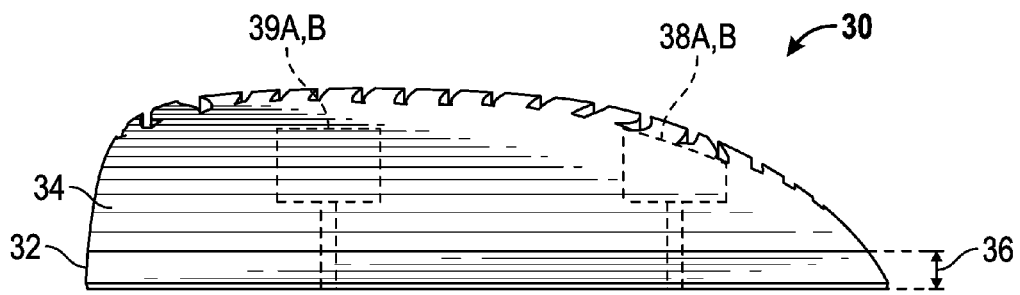
FIG. 10 is a side view of a boot attachment or shoe of embodiments of the invention.
Figure 11:
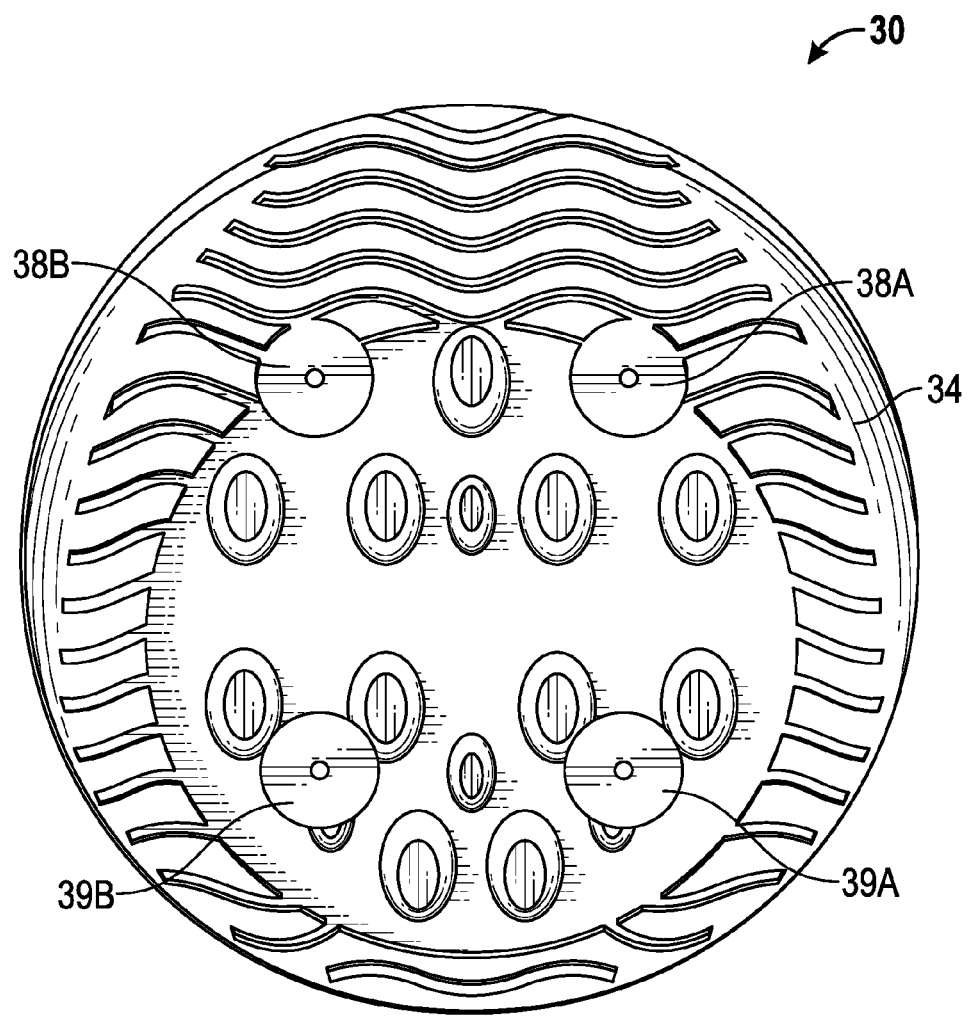
FIG. 11 is a top view of a patterned attachment of an embodiment of the invention.
Figure 12A:
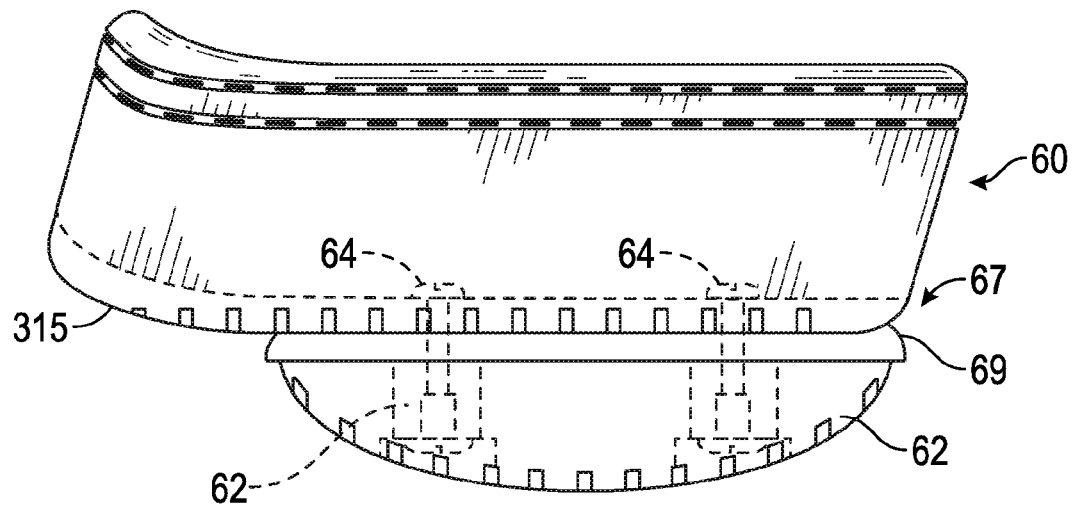
FIG. 12A is a side view of a boot sole and rocker attachment of an embodiment of the invention illustrating an attachment that slopes on both to the front and rear.
Figure 12B:
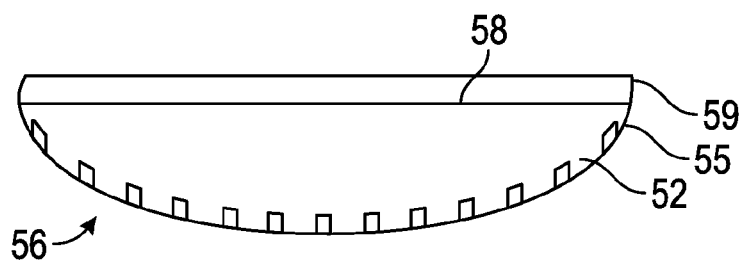
FIG. 12B is a side view of a shoe structure of an embodiment of the invention illustrating shoe structure that slopes on both to the front and rear.

When configured as a shoe the structure, as shown in FIGS. 2B, 9, 10 and 12B, will have a hard section layer (48 in FIG. 2B, 36 in FIGS. 9 and 10 and 59 in FIG. 12B) at the top of the structure and a softer larger section below (42 in FIG. 2B, 34 in FIGS. 9 and 10 and 52 in FIG. 12B). The shoe structure shown has a sloped front (46) to allow it to more easily tip forward. This slope is also better shown in FIGS. 9 and 10 that also shows attachment 30 with barrel nuts and bolts 38A, 38 B. The shoe will not generally have these barrel nut and bolts, as they are not needed. FIG. 12B shows an alternative shoe sloped in front (56) and rear (55) making a somewhat symmetrical (front to back) "rocker".

The hard top section at the top of the shoe is a layer of about ⅟₁₆ to ½ inch layer and should not be so hard as to be brittle and break in use but very rigid compared to the remainder of the shoe. Shore A hardness of about 85 to 100 is suitable for the top section and about 90-95 preferred. It is desirable that the softer lower portion that is in contact with the ground when in use be of Shore A hardness of about 45 to 70 with about 60 being preferred. This softer section cushions to hoof and leg and reduces the extreme concussive force on the legs that exist with metal and hard bottom shoes as well as giving the shoe better ground grip. The hard top holds the softer bottom together and stabilized the structural and dimensional integrity of the shoe. The hard top section prevents the softer section from spreading laterally and distorting when in use. Without the hard section bonded (at interface 58 in FIG. 12B) to the soft section the softer shoe would not be possible. It also provides a more suitable surface for attachment of to the equine hoof. The width of the shoe at its widest (measured top surface to bottom surface) is generally about 2 to 4 inches with 2.5 inches preferred. The top hard layer of ⅟₁₆ to ½ inch will constitute about 5-30% of the total shoe width. A very the dual density shoe is easily produced in an open mold in which the components (as for polyurethane gel of component composition to give the desired hardness) of the softer section is poured in an open mold, allowed to partially cure then pouring in the components of the harder top section. The bottom of the mold may be designed to provide any desired pattern on the underside of the soft section.

It is preferred that the top surface be scored or otherwise roughened to facilitate gluing to a hoof. In a prototype, the top of a polyurethane shoe was scored using a very course sandpaper on a belt sander. Any method of preparing the surface to aid in producing a better glue seal is suitable. In applying the shoe the user may use a suitable "pour in pad" such as Vettec Equi-Pak™ or other commercial packing and/or pads that will be placed on the top surface of the shoe between the top surface and underside of the hoof. A triangular shaped elastomeric frog support may also be attached to the top surface of the pad to provide frog support. Suitable frog elastomeric triangular support construction is described hereinafter in relation to elastomeric orthotic pads. Just the triangular projection as described would be attached to the top surface of the shoe appropriately placed to engage to hoof frog when the shoe is applied.

The attachment and shoe structure (FIG. 4) has a sloping front, angle a, to allow it to tip forward from a point c. Point c is the break-over point of the boot/attachment assembly and desirably located below a point near the front of the distal P phalanx, P3 (coffin bone). In general, it is desirable that the break-over be within 1-2 inches, front to back, on the attachment from the front point of P3. The ideal point, in most cases will be at or within ½ inch of the front of the P3. A convenient way to locate the front of the coffin bone is draw a perpendicular line down from the hair line of the coronet band of the hoof; where this line intersects the rocker attachment will be the ideal break-over point. The angle a is generally from about 15 to 45 degrees and preferably about 30 degrees. In some embodiments shock absorbing pads disposed inside the boots described below will be tapered back to front. In one embodiment the taper is about 5 degrees. When used with the rocker attachment described above this boot pad combination will allow the hoof a range of angles from about 5 to 30 degrees. This has been found to be an especially beneficial range for a boot/ attachment useful in treatment of laminitic horses. As described above the rear of the attachment 10 may also be sloped in the same manner as the front, angle a. The shoe and attachment shown in FIGS. 12B and 12A is sloped in front and rear making a somewhat symmetrical (front to back) "rocker". The attachment 60 in FIG. 12A has a spacer 69 and rocker attachment 61. Opening for barrel nuts and bolts (64 and 62) are shown. These are used to attachment the rocker attachment to the sole of the boot. This double sloped structure is less stable and requires the equine to adjust to the "rocking" effect thus providing more exercise and stimulation to the leg and hoof.

Figure 4:
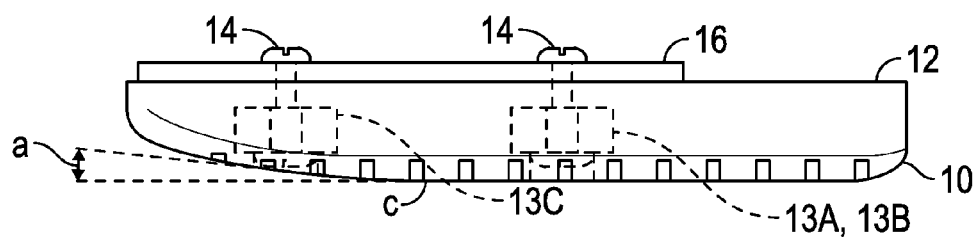
FIG. 4 is a side view of an attachment of the invention showing screws and barrel nuts as means to secure the attachment to the boot sole.

FIG. 4 (and others) shows an embodiment of the attachment, 10, of the invention configured for attachment to boots. It has a generally round projection from its surface, 12, that is designed to mate with a similar depression, 18 in FIG. 6, on the underside of the boot sole plate and dot-like depressions, 5 in FIG. 6, which mate with the projections, 3, in FIG. 1. These pattern mating parts aid in holding the attachment to the sole plate and in preventing rotation. However, while not essential, some similar means of preventing the attachment from rotating on the sole of the boot to which it is attached is desirable. In another embodiment there is provided a two-piece attachment where there is a harder spacer element attached immediately to the sole of the boot and the solid "rocker" attachment attached to the spacer as illustrated in FIGS. 4 and 7. In this case the mating projections/depressions are on the spacer not the "rocker". An important benefit of the spacer is that it may be patterned to mate with the pattern on the sole of the boot in much the same way as illustrated for the rocker in FIGS. 3 and 4. By providing the mating pattern on the spacer, rather than the rocker, the same rocker may be used on a variety of boots (with different sole patterns), and only the spacer customized for each boot sole style.

In another embodiment for the attachment to boots there is provided slots (13A, 13B and 13C of FIG. 3) in the "rocker" attachment—rather than holes—so that the attachment a can to be moved forward or back from the centerline of attachment means 14. The slots preferably extend about ⅜" to ⅛" towards the front and toward the rear of the attachment from the centerline of the screw attachment means. Preferably the slots will extend about ¼" in each direction. This allows the attachment to easily be adjusted to move the break-over forward or rearward. This is often of significant benefit in making final adjustment to suit the particular conditions of the equine hoofs.

FIG. 7 illustrates another aspect of the invention. It provides an additional wedge piece, 19, to be placed between the attachment 10 and the sole plate to allow a greater slope of the rocker attachment. This wedge is a variation on the spacer aspect discussed above. It can be secured to the rocker attachment and boot by any of the same means as discussed for securing the attachment 10 to the boot sole plate.

As shown in FIG. 5 the angle b, when the boot/attachment is fully tilted forward is about 45 degree and can usefully be from 30 to 60.degree.

The rocker attachment can be secured to the sole of a boot by any suitable means, by screws and barrel nuts as shown, 14, or by gluing or cementing or a combination of these. The screw/nut means as shown is a stainless steel barrel nut (10-24, ½ inch length) and stainless steel machine screw (10-24, 1 inch length). Securing the rocker to the boot sole by removable means, as by screw/nut combination, has the advantage of allowing the rocker attachment to be easily removed or replaced and if the spacer and/or rocker is slotted, to facilitate adjustment of the break-over point. It is often desirable to use different rocker attachments during the course of a treatment—changing the position, shape and slope as desired or required to find the most efficacious boot assembly (boot/attachment combination). Alternatively, the rocker attachment may be permanently affixed to the sole of the boot, as by molding them together. Since the sole, in most embodiments, is molded elastomeric polymer, or rubber, it is possible to make the sole with a downward projection molded into a single piece. Such single molded sole plate will be more stable and rugged.

The rocker attachment and shoe shown in the Figures has a taper (slope) toward the front of the hoof (FIGS. 9 and 10) and may also be tapered towards the rear (FIGS. 12A and 12B) and from side to side. While not shown in the Figures, the attachment, or projection, can slope from the centerline-side to side-side-to allow the hoof to rotate or tilt from side to side as well as forward. In general, the side to side taper will be, at the center of the sole plate, such that the outside will be from about 90% to 25% of the thickness of the attachment at the center. Tapering to the side can also be beneficial in relieving pressure when the hoof is turning since during turning there is generally the most pressure upon and therefore the most damage to the coffin bone and lamina.

The rocker attachment and shoe is intended to be designed and sized to provide the optimum break-over for most applications, however, when constructed of a molded elastomer they may also be customized on-site to an individual equine or individual need with standard farrier tools such as a rasp and knives.

The attachment and shoe may suitable be made of molded elastomeric polymer. It needs to be relatively hard and rigid, but not completely so. Molded polyurethane is very suitable and convenient to work with. It is preferred for the solid attachment structure that thermoplastic polyurethane of about 45 to 90 Shore A hardness be used, with Shore A hardness of 75 to 85 being especially suitable. In some applications softer materials—Shore A of about 50 to 60 are preferred to provide additional cushioning of the hoof. The suitable hardness ranges for the shoe components are detailed above in the description of the shoe. When the rocker attachment is used with deep gel pads inside the boot (as described below) there may be sufficient cushioning for most situations. The spacer may also suitably be made of molded polyurethane, in which case a hardness of about 80 to 100 is preferred and Shore A of about 90 being especially suitable. The important aspect is that the hardness can easily be adapted to the individual need of the horse to which it is applied.

In some embodiments the structure of the attachment and shoe will have fiber incorporated into it. Fibers such as those used in reinforcing cement are suitable. For example, fibers such as polypropylene, cellulose, carbon are suitable. Ultra-high density polyethylene (Dyneema™ and Spectra™) are especially suitable for strength and durability. The amount of fiber in the lower (soft) section of the shoe must be controlled to prevent the structure from becoming too hard and the amount of fiber will depend on a number of factors, particularly the composition of the material of the structure and the hardness desired. The proper amount can easily be determined by simple experiment. Powered Teflon™ may also be added to the structure composition to increase its strength and durability.

Polyurethanes are particularly suitable material for the rocker as they are easily moldable in open molds or by injection molding. Other polymer materials with similar characteristics as polyurethane, such as polyvinyl chlorides, styrene butadiene styrene polymer, epoxies and the like, are also usable. Choice of these will be well within the ability of those skilled in the polymer art to select.

The rocker attachment of the present invention will work well with most available and proposed equine boots. The rocker attachment will be adapted to fit the particular sole of the desired boot bottom, but most have elastomeric or rubber soles and adapting the attachment to fit is well within the skill of the art. It is preferred that the boots have a relatively rigid and substantial sole in order to be able to secure the attachment. It is also preferred that the sole be a solid unitary structure with an opening in the center. Fabric or other excessively flexible boot bottoms will be unsuitable. It is also preferred that the sole plate have an upper-ward extending wall surrounding the circumference to provide sufficient rigidity and prevent distortion from the stress placed upon the rocker attachment.

In one or more embodiments the boot assembly of the invention works with commercially available boot systems and very effectively with equine boots and boot/pad assemblies described in U.S. Pat. No. 7,178,321, issued Feb. 20, 2007, U.S. Pat. No. 7,445,051, issued Nov. 4, 2008, U.S. Pat. No. 8,166,734, issued May 1, 2012, U.S. Pat. No. 8,220,231, issued Jul. 17, 2012, U.S. Pat. No. 8,291,683, issued Nov. 23, 2012, U.S. Pat. No. 8,656,691, issued Feb. 24, 2014, U.S. Pat. No. 9,055,732, issued Jun. 16, 2015, 2014 U.S. Pat.

Application No. 2015/0325944, U.S. Pat. Application No. 2015/0119772, U.S. Design patents: D565256, issued Mar. 25, 2008, D62508, issued Mar. 25, 2014, issued Mar. 25, 2008 and D33013, issued Jul. 22, 2014, the disclosures of which are incorporated herein by reference for all purposes. The sloped front and rear of the boot sole described in these patents and applications provides a more gentle and beneficial break-over than conventional shoes or boots. In some embodiments the sole of the boot is narrower in the front (as is generally preferred) so that lateral break-over is also enhanced.

Some features of the present invention and the boot pad assembly of these patents and applications are described below.

In general, the boots described in the above patents and applications suitable for use with a rocker attachment comprise an upper portion made from flexible material shaped to fit the hoof of an animal and of a height to reach above the hoof of the animal for which it is designed. The boot has a front, sides, rear and bottom; the front slopes back and upward, the sides are lower than the front and rear so that when the front and rear are pulled together here is an opening in the sides. There is a fastening means at the top front and rear to fasten the front and rear together around the leg of a horse. The fabric bottom is attached to a more rigid sole plate comprising a molded elastomer base entirely circumscribed by a peripheral wall (or sides) defining a receiving area sized to fit over (or under) the bottom of the upper portion; said sole plate being securely attached to the lower circumference of the upper portion.

The sole plate is a preferably a separate molded piece and is attached to the bottom of the fabric upper. The sole plate helps to hold the boot in position on the hoof, and if walled around the entire circumference it prevents the hoof sliding forward or rearward while in use. Moreover, the sole plate is important in confining an elastomeric deep gel pad in place. If a relatively "soft" pad is used (as is often desirable) the weight of the horse will flatten the pad and, if there were an opening in the sole plate wall the pad would be extruded out the opening. In this case it is especially important that the bottom circumference of the boot be sufficiently strong to contain the soft pad when it is squeezed outwardly by the pressure of the horses' hoof. By having the sole plate wall entirely surrounding the circumstance the pad is held in place and will conform to the shape of the hoof and adapt to the shape of the hoof as the horse shifts position or moves. This allows the horse to find the best natural balance position—similar to the effect of having the horse stand in loose sand. The ability to achieve natural balance is especially important for horses with injured or diseased hoofs.

The sole plate is attached to the bottom of the fabric boot. In a preferred embodiment the bottom of the sole plate is sloped upward in the front at an angle of about five (5) to thirty (30) degrees from the bottom plane. The slope begins at a point on the bottom of the sole plate twenty (20) to forty (40) percent of the length from front to rear of the sole plate. The point of beginning is preferably about ⅓ of the distance from the front of the length of the sole plate. This angled sole plate allows the horse hoof to rock forward and backward without undue pressure on the hoof. When the horse walks the boot will "break-over" in a natural way, preventing abnormal pressure on the hoof. This rocker effect is well recognized as beneficial and there are a number of commercial products, such as the "clog" and other devises designed to "rock" with the shift in body weight of the horse allowing it to achieve a "natural balance". This semi rigid boot sole has an advantage over soft or slipper boots since it allows the horse the stability of a flat platform as well as moving the break-over point rearward at the most critical point in the arc of the swinging limb. The front tapered sole plate plus the rocker attachment provides a kind of double break-over point that provides the horse a "restful" stable platform while eliminating the high load point of its stride, especially important and more pronounced when the horse is moving forward and turning. The rotating torque during turning is when lameness shows up most and when the most damage to the lamina connective tissue occurs.

The sole plate is preferably molded of polymeric elastomer material or hard rubber (having the consistency and hardness to approximate automobile tires). Thermoplastic polyurethanes (TPUs) are suitable materials for the base plate. It is preferred that thermoplastic polyurethanes of about 55 to 75 Shore A hardness be used, with Shore A hardness of 65 to 70 being especially suitable. Other polymer materials with similar characteristics as thermoplastic polyurethanes are also usable. Choice of these will be well within the ability of those skilled in the polymer art to select.

The base of the elastomeric deep gel pad (FIG. 8) is generally shaped to approximate the shape of the animal's hoof print. This pad, made of shock absorbing material can be easily trimmed to conform to the hoof of the individual animal on which it will be used. In one embodiment, on the backside of the base, opposite the ridge, is a frog support. This is a triangular projection (FIG. 8) above the surface of the base. This triangular projection is designed to approximately correspond to the shape and location of the frog of a horse's hoof. It has been found that the height of the frog support from the sole is very important to provide adequate uniform pressure as well as cushioning of the hoof. This frog support provides increased blood flow to the leg of the animal. The function of the triangle projection is to contact the frog during use, to provide a kind of massage to the frog of the hoof. Thus, blood circulation is stimulated and stress on the animal's legs and tendons are relieved. It is well known that the hoof frog acts somewhat as a blood pump. See for example, U.S. Pat. No. 4,981,010 where it is stated "The horny frog (58) is very elastic and acts as a shock absorber and as a second heart to the horse. As the hoof is pressed against the ground, old blood is forced up and out of the foot. When the hoof is lifted off the ground, the elastic frog (58) springs back, letting new blood into the foot." The frog support aids in this blood circulation. It is this pumping action of the frog that makes the cooling of the sole of the hoof especially effective.

Figure 8:
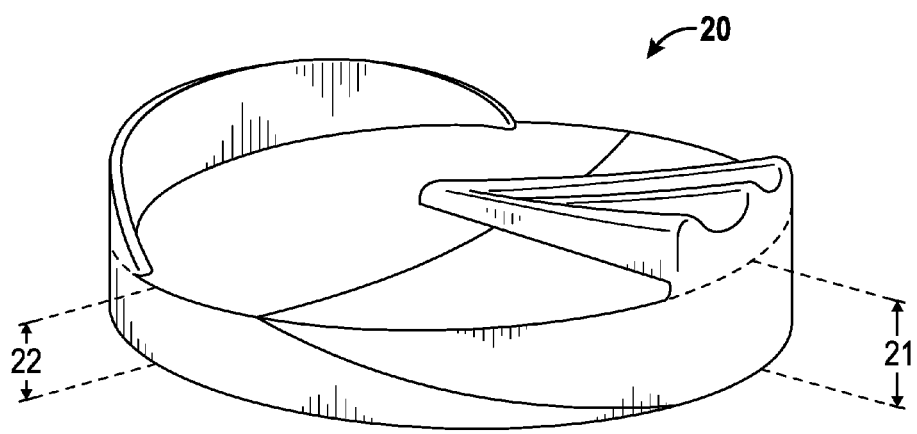
FIG. 8 is a perspective view of a pad that is inserted into a boot of an embodiment of the invention.

In other embodiments, the pad will not have the triangular projection or the front projection. When used with a horse that has an abscessed or injured frog it may be desirable to use a pad without the frog support. Also the improved sole plate of the boot makes it is possible to eliminate the front projection for some applications. However, even without the frog support the front ridge projection (FIG. 8) is often useful, especially for a horse with a severely injured or damaged hoof. At times it is necessary to resection (remove the front hard hoof surface) a horses hoof if it is damaged or diseased. Such is the case with advanced laminitis. In such cases the soft front support ridge provides extra comfort to the hoof, especially if the pad is wedged shaped (sloped) in a way that forces the front of the hoof downward. FIG. 8 shows a wedged shaped pad where dimension 21 is greater than dimension 22. It is the burden of the base of the pad to supply the bulk of the support for the animal. The frog support is an aid to stimulation of the frog and is not the principal means of supporting the hoof. In this way, the present invention differs from previous frog support shoes or pads. The relative large and soft pad of the present invention enables the horse to adjust the position of its hoof to the most comfortable position.

It has also been found that the shape of the pad is important. Round pads have been found to not perform well in actual use as slightly elliptical pads; they tend to rotate in the boot. An elliptical shaped pad is desirable to maintain consistent fit and to prevent rotation in the pad in use. The pad is shaped to fit the configuration of the equine hoof; many horses have hoofs that, while elliptical are more nearly round. Arabian horses, as well as horses that have elongated "toes" due to injury, disease or otherwise, have narrower hoofs so the elliptical shape is more pronounced.

The base of the gel pad is made of any suitable elastomeric polymer material that provides flexibility, shock absorbency, some degree of elasticity, resilience and has dimensional stability. Polyvinyl chloride PVC, polysilicone and similar elastomers well known to those in the art are also suitable. In a preferred embodiment, the base is constructed of a cast polyurethane elastomer. For example polyurethane-casting elastomer having a Shore A hardness of from about 10 to about 70 is suitable. It is preferred that the base be of about 20 to 70 Shore A hardness and the support be of about 8 to 50 Shore A hardness. In one embodiment, very soft pads are desirable. These should be thicker than harder pads and will have a Shore 00 hardness of about 5 to 70.

In another important embodiment the base of the pad is made of components of different densities or hardness, herein referred to a duel density pad. This pad has a base, for example, comprising a front component of shock absorbing material of lower hardness than a rear component, the front component comprising the forward 20 to 40 percent of the length from front to rear of the pad and the rear component comprising 20 to 40 percent of the length of the base from front to rear, wherein the two components overlap in the center of the base that is not occupied solely by the front or rear component. A very useful pad is made with the front component comprising about ⅓ of the length, the rear component ⅓ of the rear and ⅓ overlap. It is also sometimes desirable to reverse the duel components with the harder portion in front and the softer in the rear.

A very suitable duel density pad will be made of a polyurethane elastomer; the front component having a Shore A hardness of less than twenty (20) and the rear component having a Shore A hardness of between 20 and 40. More desirability the front has a Shore A of 5 or less, and the rear component a Shore A of about 28-32. As with the single density pad, there is also a need for pads having softer front components—Shore 00 of 5 to about 70. Elastomers, such as polyurethane, can be formulated in wide range of rebound resiliencies.

For the pads of this invention it is preferred that the pad material have low rebound resiliency, generally lower that twenty five (25) percent, and more desirably between two (2) and ten (10) percent.

The combination of the lesser "rocker" of the boot described, together with the solid "rocker" attachment of this invention and the softer deep gel pad gives the maximum flexibility for a horse to shift the weight and pressure points of its stance to find the most comfortable and least damaging position. This combination of a boot/pad/rocker attachment is an important embodiment of this invention.

In another aspect the invention is a kit for providing a rocker attachment to the underside of an equine boot comprising a one or two piece attachment (as described above) shaped to allow the boot to rotate forward or back having a break-over point within two (2) inches of the centerline, front to back, of the sole of the boot, specially adapted to fit the boot sole to which it is to be secured and a means of securing the attachment to the boot sole. The rocker will generally patterned to mate with the patterned on the boot sole on which it is to be used. If a spacer is provided, it, rather than the rocker, will be so patterned. The rocker and/or spacer may also be slotted as described above. The attachment means may be adhesive or mechanical such as the screw/nut combination (14) as illustrated in the Figures. The kit will contain the attachment and securing means packaged for convenience. The user will generally specify the boot by name or description and an attachment, optionally with instructions, to fit the boot can be supplied. Since there are thousands of boots by type, design and size, many of the attachments will be custom made to order.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept. The specification and drawings are, accordingly, to be regarded in an illustrative rather than a restrictive sense. Therefore, the scope of the invention should be limited only by the appended claims.

The invention claimed is:

1. An equine boot assembly comprising;
a fabric boot having sides and a closed bottom disposed in a sole plate structure having an underside and side walls that define a receptacle for the bottom of the fabric boot, the sole plate structure side walls being sufficient in height to constrain lateral expansion of a deformable elastomer gel orthotic pad and in which the underside of the sole plate structure is sloped from a centerline measured front to back toward the front of the sole plate structure; and
a removable solid rocker attachment structure having no opening in a center that is attachable to the underside of the sole plate structure, the removable solid rocker attachment structure having a top side, a bottom side, edges, a front and a rear, wherein the top side is straight and the bottom side is sloped from a centerline measured front to back toward a front of the rocker attachment structure and wherein the removable solid rocker attachment structure having a top polymer section and a softer lower polymer section below the top section, the top section abutting the lower section and molded thereto;
wherein a spacer element is disposed between the solid rocker attachment structure and the underside of the sole plate structure with securing means that allow the removable solid rocker attachment structure to be moved.

2. The assembly of claim 1 wherein the solid rocker attachment structure is made of polyurethane having a Shore A hardness above about 75-85.

3. The assembly of claim 1 wherein the solid rocker attachment structure bottom side is sloped to the front from the center measured from front to back at an angle of 15 to 45° and is rounded at the rear.

4. The assembly of claim 1 wherein the solid rocker attachment structure contains polymeric fibers or powered TEFLON™.

5. The assembly of claim 1 wherein the solid rocker attachment structure and the spacer element are molded together as an integral piece.

6. The assembly of claim 1 wherein the solid rocker attachment structure and the spacer element are molded of polyurethane, and the spacer element is made of harder material than the softer lower polymer section of the solid rocker attachment structure.

7. The assembly of claim 1 further comprising the deformable elastomer gel orthotic pad disposed in the bottom of the fabric boot wherein the elastomer gel orthotic pad has a Shore A hardness of from about 20 to 70 and whereas the solid rocker attachment structure has an underside that is patterned.

8. The assembly of claim 1 wherein the underside of the sole plate structure is patterned and a top side of the spacer element is patterned in a manner to mate with the pattern of the underside of the boot.

9. The equine shoe of claim 1 wherein the top polymer section of the solid rocker attachment structure is made of a hard polymer having a width of about 5-30% total width of the solid rocker attachment structure and has a Shore A hardness of from about 85 to 100 and wherein the softer lower polymer section has a Shore A hardness of about 45-70.

* * * * *